(12) United States Patent
Lai et al.

(10) Patent No.: US 11,884,545 B2
(45) Date of Patent: Jan. 30, 2024

(54) METHOD FOR MANUFACTURING COMPLEX SI-C CATHODE BASE UNITS AND THE BASE UNIT MADE OF THE METHOD

(71) Applicant: SolidEdge Solution Inc., Hsinchu (TW)

(72) Inventors: Hong-Zheng Lai, Hsinchu (TW); Tseng-Lung Chang, Hsinchu (TW)

(73) Assignee: SolidEdge Solution Inc., Hsinchu (TW)

( * ) Notice: Subject to any disclaimer, the term of this patent is extended or adjusted under 35 U.S.C. 154(b) by 955 days.

(21) Appl. No.: 16/852,571

(22) Filed: Apr. 20, 2020

(65) Prior Publication Data

US 2021/0323827 A1 Oct. 21, 2021

(51) Int. Cl.

| | | |
|---|---|---|
| *B32B 9/00* | (2006.01) | |
| *C01B 32/174* | (2017.01) | |
| *C01B 32/194* | (2017.01) | |
| *H01M 4/04* | (2006.01) | |
| *H01M 4/36* | (2006.01) | |
| *H01M 4/583* | (2010.01) | |
| *H01M 4/38* | (2006.01) | |
| *H01M 4/02* | (2006.01) | |
| *B82Y 30/00* | (2011.01) | |
| *B82Y 40/00* | (2011.01) | |

(52) U.S. Cl.
CPC .......... *C01B 32/174* (2017.08); *C01B 32/194* (2017.08); *H01M 4/04* (2013.01); *H01M 4/362* (2013.01); *H01M 4/386* (2013.01); *H01M 4/583* (2013.01); *B82Y 30/00* (2013.01); *B82Y 40/00* (2013.01); *C01P 2004/64* (2013.01); *H01M 2004/028* (2013.01)

(58) Field of Classification Search
CPC ....... B82Y 30/00; B82Y 40/00; Y10T 428/30; C01B 32/174; C01B 32/194; H01M 4/04; H01M 4/583; H01M 4/362; H01M 4/386
USPC .......................................... 428/408; 423/448
See application file for complete search history.

(56) References Cited

FOREIGN PATENT DOCUMENTS

| | | |
|---|---|---|
| CN | 103633295 A | 3/2014 |
| CN | 106025219 A | 10/2016 |
| CN | 106415898 A | 2/2017 |
| CN | 108899485 A | 11/2018 |

*Primary Examiner* — Daniel H Miller
(74) *Attorney, Agent, or Firm* — ScienBiziP, P.C.

(57) ABSTRACT

A method for manufacturing complex Si—C cathode base units includes the steps of: pulverizing a graphene block; mixing the plurality of graphene pieces with ethanol and first high molecular material; dispersing and pulverizing powders of silicon, and silicon oxide (SiOx) into a plurality of complex monomers; and then they being mixed with high molecular graphene recipe gel solution; spraying and drying Si—C solution to form with first order Si—C nanoparticles; a plurality of buffer spaces being formed in the plurality of graphene pieces; mixing first order SIC nanoparticles, second high molecular material, and a small amount of nanometer carbon tubes and then calcined them; the first order SiC nanoparticles, the second high molecular material and the nanometer carbon tubes being shaped or being sprayed and dried; and finally, calcining them to form as third order SIC nanoparticles which is the complex Si—C based unit.

13 Claims, 6 Drawing Sheets

METHOD FOR MANUFACTURING COMPLEX SI-C CATHODE BASE UNITS AND THE BASE UNIT MADE OF THE METHOD

FIELD OF THE INVENTION

The present invention is related to cathode materials, and in particular to a method for manufacturing complex Si—C cathode base units and the base unit made of the method.

BACKGROUND OF THE INVENTION

In the material of cathode electrodes of lithium batteries, lithium atoms are embedded into the graphite. However, since the capacitance of the graphite is limited and thus it is not suitable in the future development of batteries. A preferred way for improving this defects is that silicon (pure silicon, or silicon oxide) is used with graphite. Because the capacitor of the silicon material is higher than that of the graphite, the whole negative electrode has higher capacitance so that the amount of power storage of the battery is increased.

In the conventional silicon lithium battery, the lithium atoms will embed into crystal structures of silicon material by electrical chemical reaction. When it is discharged, under consideration of chemical property, most of active lithium atoms will leave from the crystal structure, a part of the reactive lithium atoms sub-reacts into lithium salt which are decomposed from the crystal structure and are and thus deposited around the silicon material to be formed as a film, that is SEI film. In charging reaction, because the silicon material receives lithium, silicon-lithium crystal structure is formed. Thus this structure is larger than the original silicon structure so that the whole volume expands, while in discharging reaction, reactive lithium atoms leave from the silicon crystal structure so as to form with holes in the silicon structure. As a result, the whole material becomes soft. Under electrochemical reaction, the whole structure will elapse. After charging and discharging actions many times, the holes will distort and then crack and deform so as to reduce the capacitance of the silicon material.

Therefore, the object of the present invention is to provide a novel method for manufacturing complex Si—C cathode base units and the base unit made from the method so as to resolve the problem of the prior arts.

SUMMARY OF THE INVENTION

Accordingly, for improving above mentioned defects in the prior art, the object of the present invention is to provide a method for manufacturing complex Si—C cathode base units and the base unit made of the method, wherein in this structure of complex C—Si cathode base unit, the graphene pieces have flexible and elastic structures which are not deformed easily so that they can limit expansions of the complex monomers and thus, the complex monomers are not deformed easily and not pulverize. Another, in the whole first order SIC nanoparticle, a plurality of buffer gaps are formed in the plurality of graphene pieces, the first high molecular material and the nanometer scale complex monomers. The buffer spaces serve to receive the expansions of the complex monomers so that the whole first order SIC nanoparticle may retain with a fixed small volume for a long time. Furthermore, the second high molecular material layer encloses the first order SiC nanoparticle. After calcining the second high molecular material layer, the nanometer carbon tubes encloses the second high molecular material layer by homogenization. In the calcinations process, the carbohydrate is carbonized so as to increase the capacitance and the structure can be retained effectively.

To achieve above object, the present invention provides a method for manufacturing complex Si—C cathode base units, comprising the following steps of: Step A: pulverizing a graphene block into a plurality of graphene pieces; Step B: mixing the plurality of graphene pieces with ethanol and first high molecular material, and then they being mixed and agitated to form viscous high molecular graphene recipe gel solution; Step C: dispersing and pulverizing powders of silicon, and silicon oxide (SiOx) into a plurality of complex monomers which are formed of nanometer scaled silicon powders and silicon oxide powders; and then the complex monomers being mixed with the high molecular graphene recipe gel solution so as to form as Si—C solution; Step D: spraying and drying the Si—C solution, that is: the Si—C solution is sprayed out to form micro particles and then the micro particles are dried so as to evaporate the ethanol in the Si—C solution to form with first order Si—C nanoparticles; the main structure of each first Si—C nanoparticles includes the plurality of graphene pieces, the plurality of complex monomers and the first high molecular material; the first high molecular material is used as viscosity for combining the plurality of graphene pieces and the plurality of complex monomers; a plurality of buffer spaces are formed in the plurality of graphene pieces, the first high molecular material and the nanometer scale complex monomers for receiving expansions of the complex monomers; Step E: mixing first order SIC nanoparticles, second high molecular material, and a small amount of nanometer carbon tubes and then calcined them; or mixing and calcining the first order SIC nanoparticles and the second high molecular material firstly and then they being further mixed with the nanometer carbon tubes; Step F: the first order SiC nanoparticles, the second high molecular material and the nanometer carbon tubes being shaped or being sprayed and dried so as to form as second order SiC nanoparticles; and Step G: calcining the second order SiC nanoparticles in a calcination oven so as to form as third order SIC nanoparticles which is the complex Si—C based unit.

Furthermore, the present invention provides a complex Si—C cathode base units, comprising: a first order SiC nanoparticle including a plurality of graphene pieces, and a plurality of complex monomers formed by nanometer scale silicide, and first high molecular material; the first high molecular material is used as viscosity for combining the plurality of graphene pieces and the plurality of complex monomers, a plurality of buffer spaces are formed between the plurality of graphene pieces, the complex monomers and the first high molecular material; a second high molecular material layer enclosing the first order SiC nanoparticle; the second high molecular material layer being calcined in a calcination process, so that the carbohydrate therein is carbonized; and a plurality of nanometer carbon tubes tightly enclosing the second high molecular material layer so that the first order SiC nanoparticle is difficult to expand; wherein the nanometer carbon tubes have lengths between 15~25 μm and are arranged as an array.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 2:
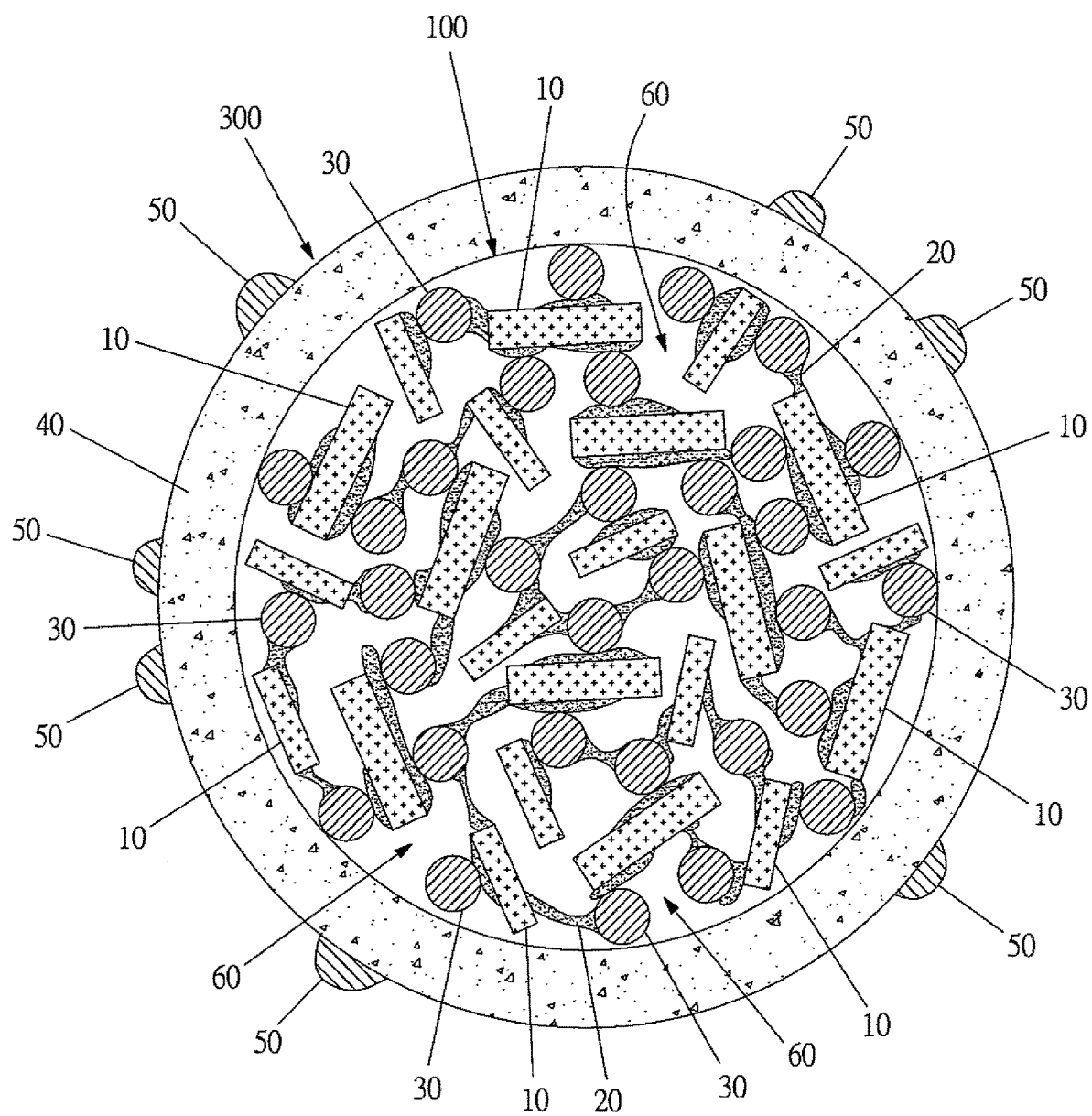
FIG. 2 is a cross section view about the second order SiC nanoparticle according to the manufacturing process of the present invention.
Figure 3:
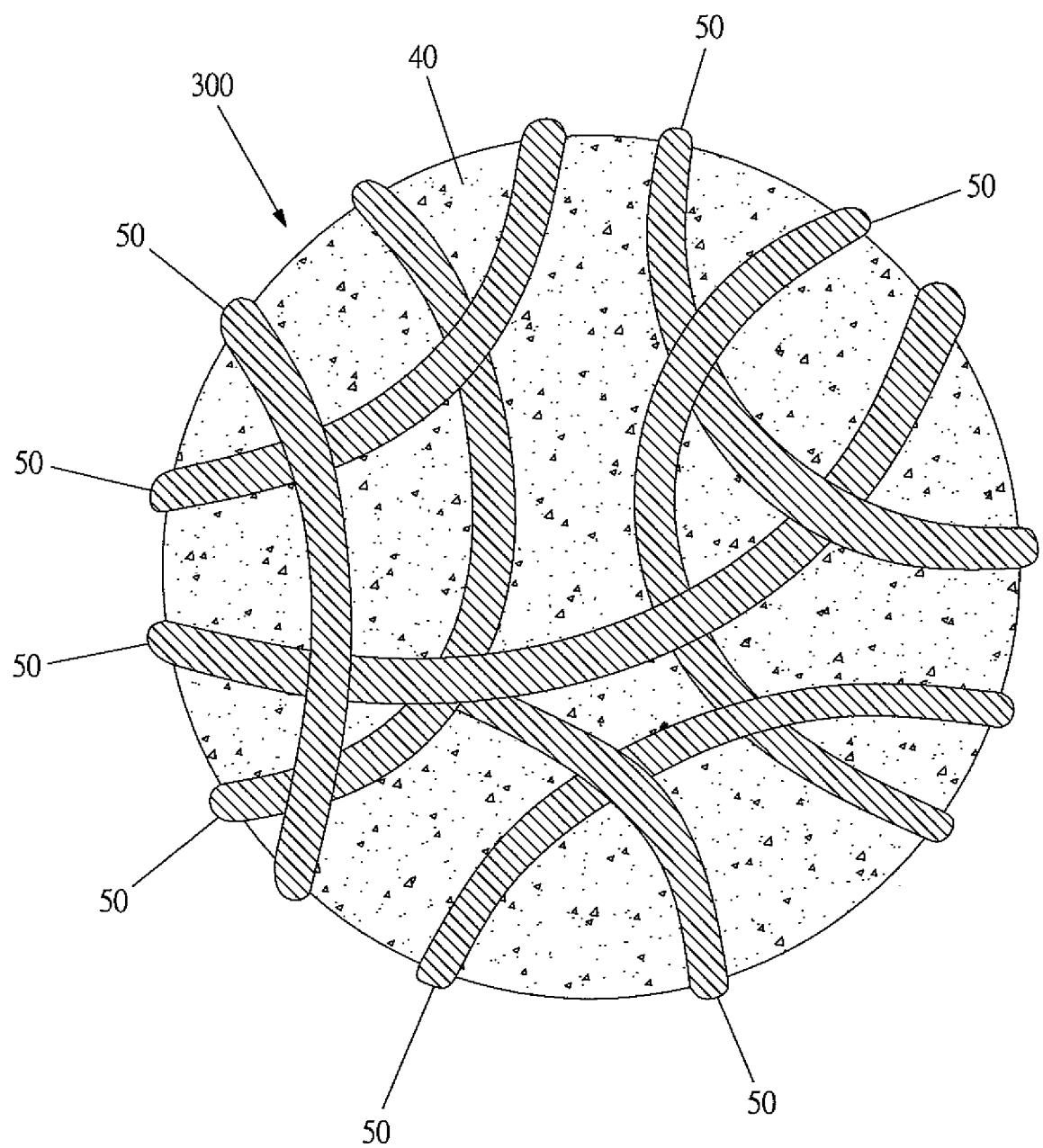
FIG. 3 is a perspective view about the third order SiC nanoparticle of the present invention.
Figure 4:
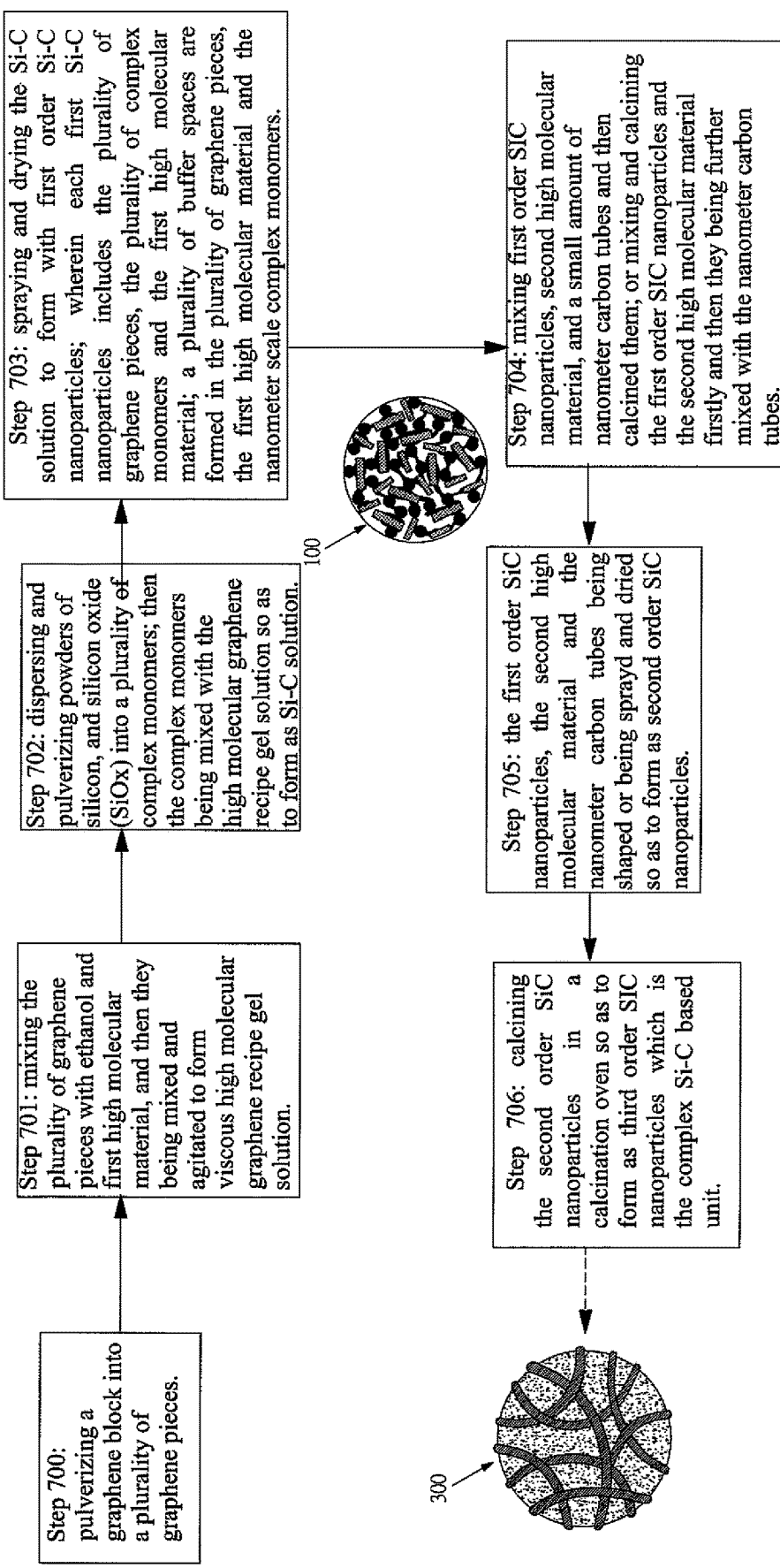
FIG. 4 shows the manufacturing processes of the present invention.

Referring to FIGS. 1 to 4, the manufacturing process according to the present invention is illustrated. The flow and process is illustrated in FIG. 4, and comprise the following steps:

Pulverizing a graphene block into a plurality of graphene pieces 10 (step 700); wherein the size of each graphene piece 10 is smaller than 3 micrometers; and the method for pulverization is selected from one of orbital motion mixing, wet grinding, high pressure uniform grinding, etc.

The plurality of graphene pieces 10 are mixed with ethanol and first high molecular material 20, and then they are mixed and agitated to form viscous high molecular graphene recipe gel solution (step 701); wherein the first high molecular material 20 is selected from one of high molecular cellulose carbohydrate material or high molecular unsaturated carbohydrate material, wherein the weight ratio of the graphene pieces 10, ethanol, and first high molecular material 20 are (0.15~0.20):(0.01~0.015):(0.77~0.84). The high molecular cellulose carbohydrate, or the high molecular unsaturated carbohydrate is for example, CMC(Carboxymethyl cellulose), Alginate, PVP(Polyvinylpyrrolidone), PVA(Polyvinyl alcohol) Glucose, etc.

Then powders of silicon, and silicon oxide (SiOx, where the x is smaller than 2) are dispersed and pulverized into a plurality of complex monomers 30 which are formed of nanometer scaled silicon powders and silicon oxide powders. The silicon powders in the complex monomers 30 have a weight percentage of 10% to 90%. Then the complex monomers 30 are mixed with the high molecular graphene recipe gel solution so as to form as Si—C solution (step 702). The way for mixing may be one of high pressure homogenizer and orbital motion mixer. This is known in the prior art and thus the details are not described herein.

Figure 1:
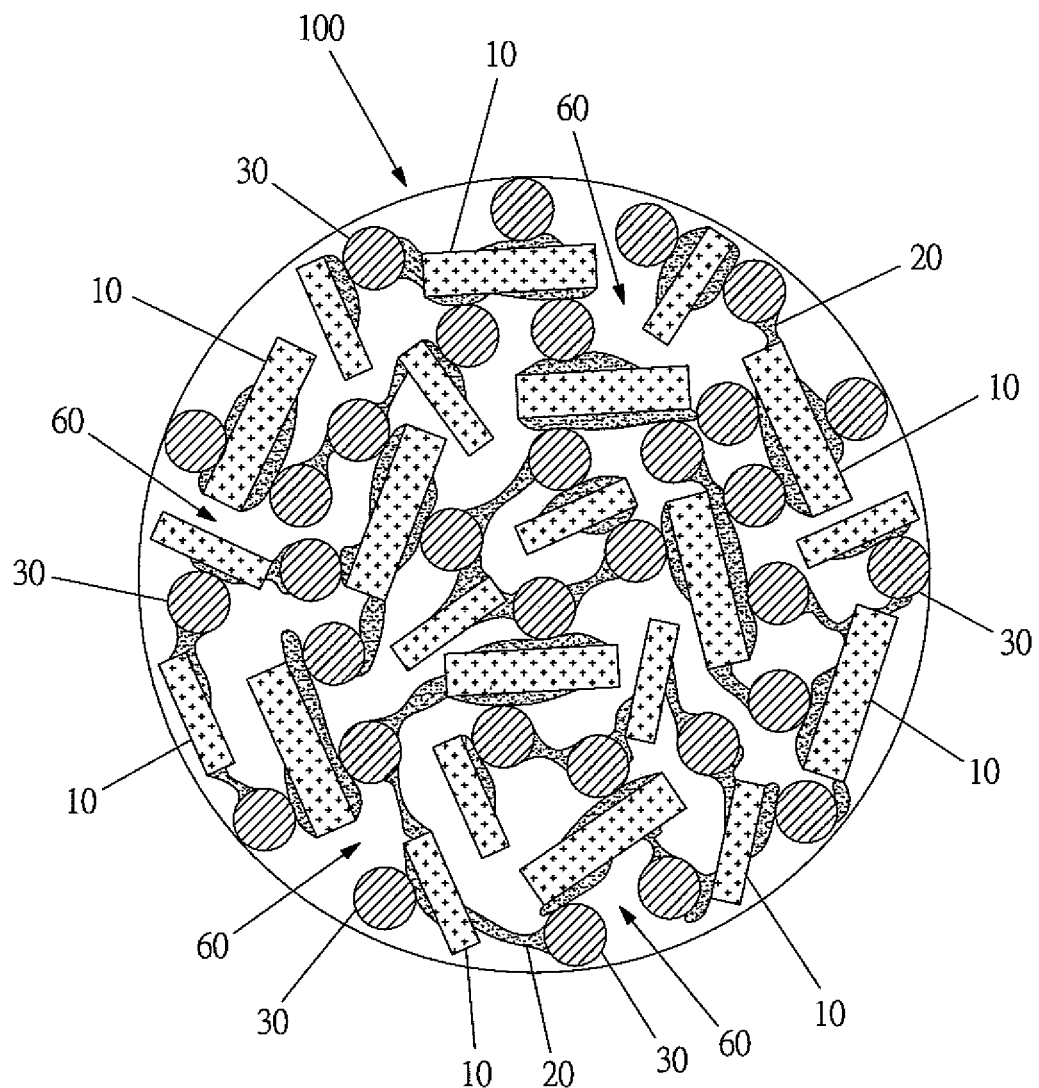
FIG. 1 is a schematic view showing the first order SiC nanoparticle according to the manufacturing process of the present invention.

Next, the Si—C solution is sprayed and dried. That is: the Si—C solution is sprayed out to form micro particles and then the micro particles are dried. The object is to evaporate the ethanol in the Si—C solution to form with first order carbon silicide nanoparticles 100. The main structure of the first carbon silicide nanoparticles 100 includes the plurality of graphene pieces 10, the plurality of complex monomers 30 and the first high molecular material 20. The first high molecular material 20 is used as viscosity for combining the plurality of graphene pieces 10 and the plurality of complex monomers 30 (step 703), as illustrated in FIG. 1. In this structure, the graphene pieces 10 have flexible and elastic structures which are not deformed easily so that they can limit expansions of the complex monomers 30 and thus, the complex monomers 30 are not deformed easily and fractured. Another, as illustrated in FIG. 1, in the whole first order Si—C nanoparticle 100, a plurality of recesses or buffer spaces are formed in the plurality of graphene pieces 10, the first high molecular material 20 and the nanometer scale complex monomers 30. Furthermore a plurality of buffer spaces 60 are formed therebetween. The buffer spaces 60 serve to receive the expansions of the complex monomers 30 so that the whole first order SIC nanoparticle 100 may retain with a fixed volume for a long time. Furthermore, the material acquired from the present invention can be used as material of cathode electrodes and has higher capacitances. As a result, the lifetime of a battery using material of the present invention is prolonged.

The further process of the present invention will be described herein.

The mixing and calcination process is performed with the steps of: mixing and calcining a first order SIC nanoparticles 100, second high molecular material 40, and a small amount of nanometer carbon tubes 50; or mixing and calcining the first order SIC nanoparticles 100 and the second high molecular material 40 firstly and then they are further mixed with the nanometer carbon tubes 50 (step 704). Weight ratios of the first order SIC nanoparticles 100, the second high molecular material 40 and the nanometer carbon tubes 50 are (0.80~0.84):(0.16~0.19):(0.0001~0.005). The second high molecular material 40 is a high molecular polymerizable carbohydrate, such as CMC(Carboxymethyl cellulose), Alginate, PVP(Polyvinylpyrrolidone), PVA(Polyvinyl alcohol), and Glucose. The molecular weight, polymerization and viscosity of the second high molecular material 40 are higher than those of the first high molecular material 20. The nanometer carbon tubes 50 are array nanometer carbon tubes with lengths between 15-25 μm which have preferred conductivity and perfect structures.

The first order Si—C nanoparticles 100, the second high molecular material 40 and the nanometer carbon tubes 50 (small amount) are shaped with special ways, such as VC homogenization (mixing through V shape homogenization machine) or spraying and drying so as to form as second order Si—C nanoparticles 100 (step 705).

The second order SiC nanoparticles 100 are calcined in a calcinations oven to form as third order SIC nanoparticles 300 which is not covered by unshaped carbons (step 706)

A structure of the third order SiC nanoparticle 300 is that the first order SIC nanoparticle 100 is enclosed by an outer layer formed of second high molecular material 40, as illustrated in FIG. 2 and a layer of nanometer carbon tubes 50 are tightly enclosed the outer layer which is the second high molecular material 40. In that, the outer layer of second high molecular material 40 are calcined in the calcinations process, so that the carbohydrate therein is carbonized so as to increase the whole capacitance of the third order SIC nanoparticles 300. Referring to FIG. 3, the nanometer carbon tubes 50 enclosing the second high molecular material 40 provide the function of tightening the whole structure of the third order SIC nanoparticles 300. This induces that the first order SIC nanoparticles 100 are difficult to expand and thus the combination of the whole structure is enhanced further.

Figure 5:
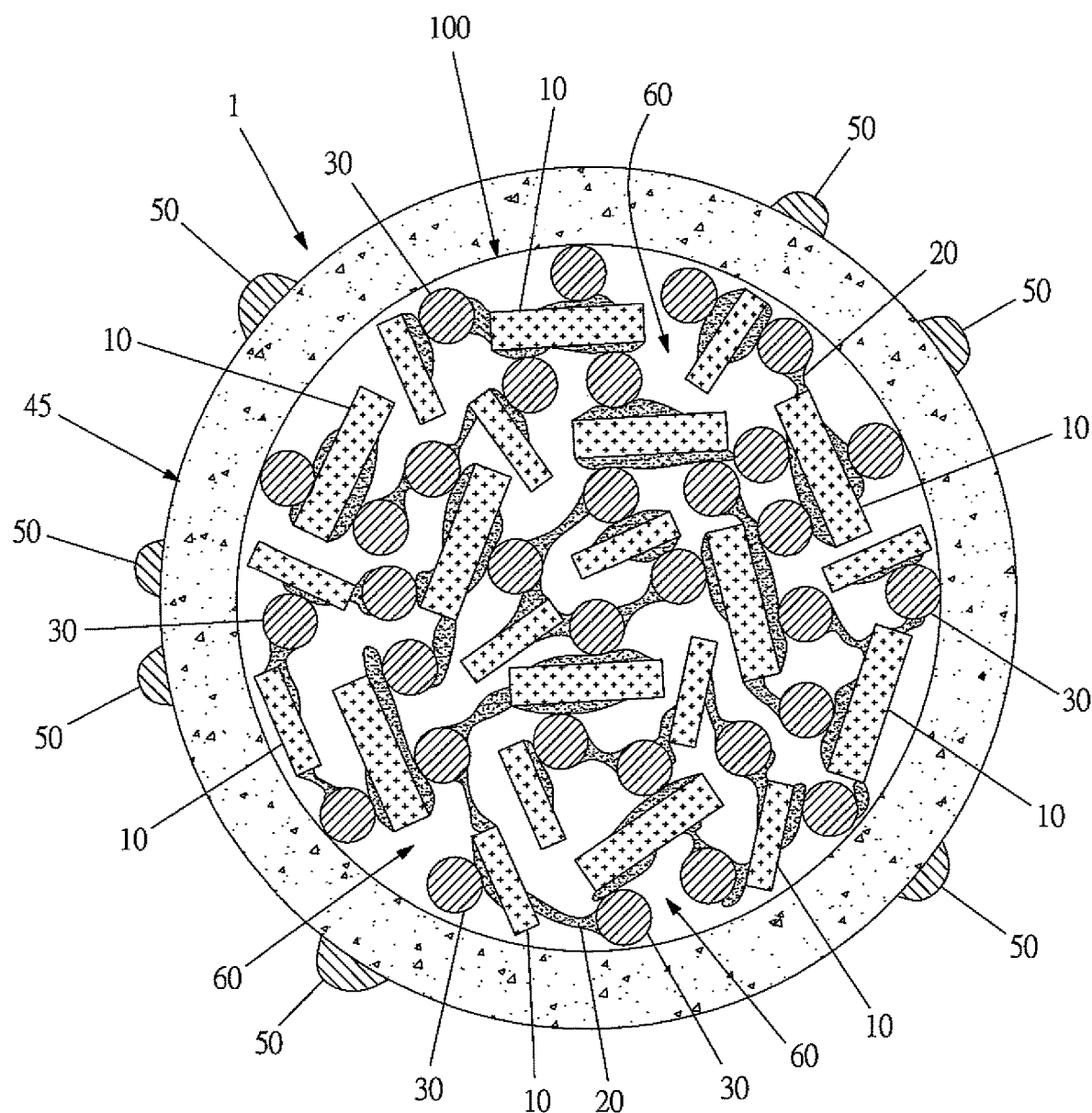
FIG. 5 shows the cross section view of the complex SiC cathode base unit of the present invention.
Figure 6:
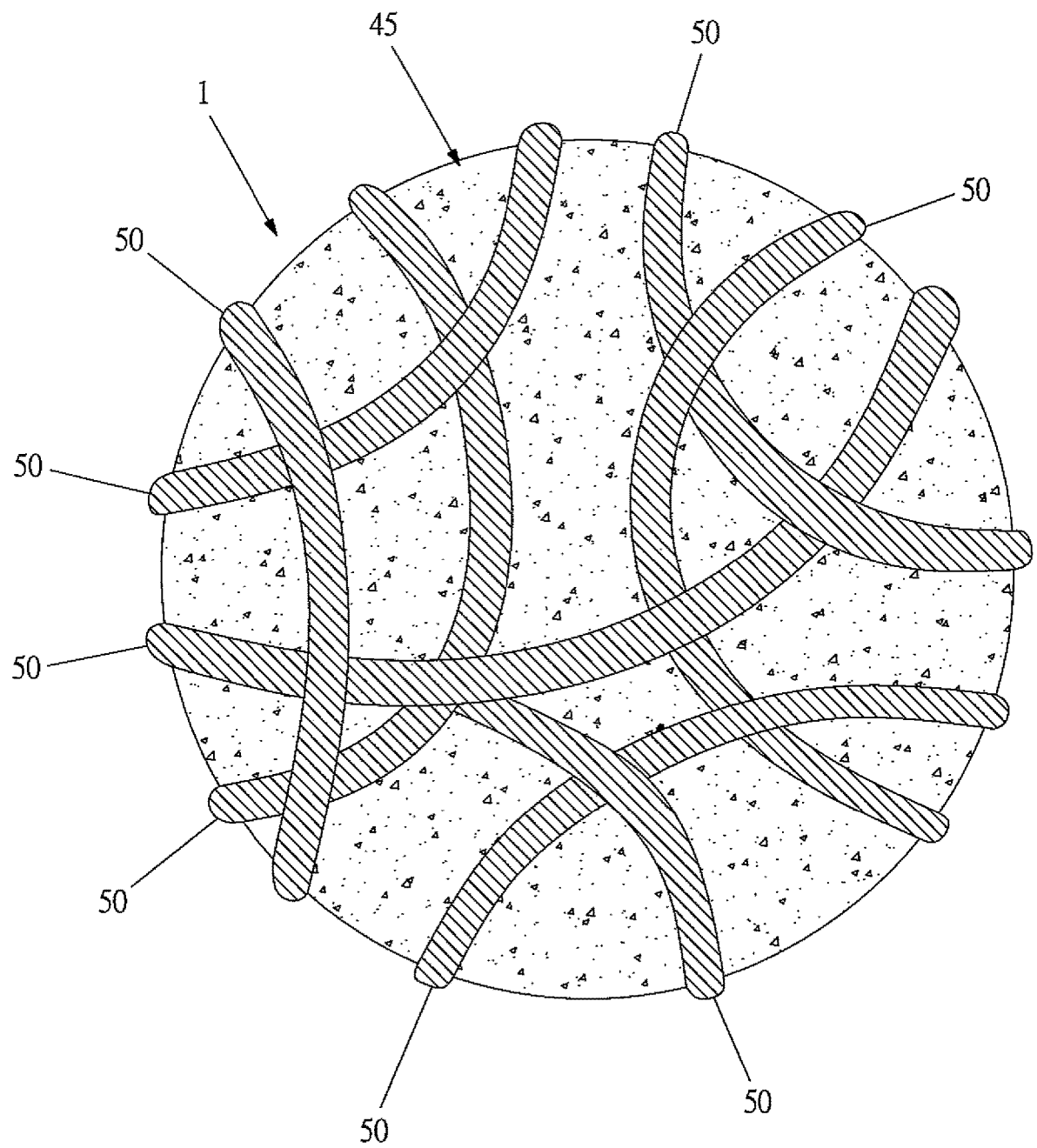
FIG. 6 is a perspective view about the complex SiC cathode base unit of the present invention.

With reference to FIGS. 5 and 6, the present invention further provides a complex Si—C cathode base unit, which comprises the following elements.

A first order SiC nanoparticle 100 includes a plurality of graphene pieces 10, a plurality of complex monomers 30 which are formed by nanometer scale silicide and first high molecular material 20. The first high molecular material 20 is as viscosity for combining the plurality of graphene pieces 10 and the plurality of complex monomers 30, as illustrated in FIG. 5. Contents of the plurality of graphene-pieces 10, the plurality of complex monomers 30 and the first high molecular material 20 are greater than zero, which are adjustable as desired. The weight ratios of the graphene pieces 10, the complex monomers 30 and the first high molecular material 20 are, for example, (0.19~0.33): (0.47~0.59):(0.20~0.22), A plurality of buffer spaces 60 are formed between the plurality of graphene pieces 10, the complex monomers 30 and the first high molecular material 20.

The plurality of graphene pieces 10 are formed by pulverizing graphene with a size smaller than 3 micrometers; the complex monomers 30 formed of the nanometer scale silicon and the silicon oxide is formed by coating silicon oxide on silicon powders. The first high molecular material 20 is selected from one of high molecular cellulose carbohydrate material or high molecular unsaturated carbohydrate material. The high molecular cellulose carbohydrate material and high molecular unsaturated carbohydrate material are, for example, CMC, Alginate, PVP, PVA, Glucose, etc.

A second high molecular material layer 45 enclosing the first order SiC nanoparticle 100. The second high molecular material layer 45 is formed by high molecular polymerizable carbohydrate which is for example, CMC(Carboxymethyl cellulose), Alginate, PVP(Polyvinylpyrrolidone), PVA (Polyvinyl alcohol), or Glucose. The molecular weight, polymerization and viscosity of the second high molecular material layer 45 are higher than those of the first high molecular material 20. The second high molecular material layer 45 is calcined in the calcination process, so that the carbohydrate therein is carbonized to increase the conductivity of whole complex Si—C cathode base unit. The unshaped carbon film enhances the structure of the compound material and the ability to anti-expansion.

A plurality of nanometer carbon tubes 50 tightly encloses the second high molecular material layer 45 so that the first order Si—C nanoparticle 100 is difficult to expand. The combination of the whole structure is further enhanced. The nanometer carbon tubes 50 have lengths between 15~25 μm and are arranged as an array so that they have preferred conductivity and perfect structure.

In this structure of complex Si—C cathode base unit 1, the graphene pieces 10 have flexible and elastic structures which are not deformed easily so that they can limit expansions of the complex monomers 30 and thus, the complex monomers 30 are not deformed easily and not pulverize. Another, in the whole first order Si—C nanoparticle 100, a plurality of buffer gaps 60 are formed in the plurality of graphene pieces 10, the first high molecular material 20 and the nanometer scale complex monomers 30. The buffer spaces 60 serve to receive the expansions of the complex monomers 30 so that the whole first order Si—C nanoparticle 100 may retain with a fixed small volume for a long time. Furthermore, the second high molecular material layer 45 encloses the first order Si—C nanoparticle 100. After calcining the second high molecular material layer 45, the nanometer carbon tubes 50 encloses the second high molecular material layer 45 by homogenization. In the calcinations process, the carbohydrate is carbonized so as to increase the capacitance and the structure can be retained effectively.

Therefore, as the material of the present invention is used as material of cathode electrode, the cathode electrode has higher capacitance and have long lifetime.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for manufacturing complex Si—C cathode base units, comprising the following steps of:
    Step A: pulverizing a graphene block into a plurality of graphene pieces;
    Step B: mixing the plurality of graphene pieces with ethanol and first high molecular material, and then they being mixed and agitated to form viscous high molecular graphene recipe gel solution;
    Step C: dispersing and pulverizing powders of silicon, and silicon oxide (SiOx) into a plurality of complex monomers which are formed of nanometer scaled silicon powders and silicon oxide powders; and then the complex monomers being mixed with the high molecular graphene recipe gel solution so as to form as Si—C solution;
    Step D: spraying and drying the Si—C solution, that is: the Si—C solution is sprayed out to form micro particles and then the micro particles are dried so as to evaporate the ethanol in the Si—C solution to form with first order Si—C nanoparticles; wherein each first Si—C nanoparticles includes the plurality of graphene pieces, the plurality of complex monomers and the first high molecular material; the first high molecular material is used as viscosity for combining the plurality of graphene pieces and the plurality of complex monomers; a plurality of buffer spaces are formed in the plurality of graphene pieces, the first high molecular material and the nanometer scale complex monomers for receiving expansions of the complex monomers;
    Step E: mixing first order SIC nanoparticles, second high molecular material, and a small amount of nanometer carbon tubes and then calcined them; or mixing and calcining the first order SIC nanoparticles and the second high molecular material firstly and then they being further mixed with the nanometer carbon tubes;
    Step F: the first order SiC nanoparticles, the second high molecular material and the nanometer carbon tubes being shaped or being sprayed and dried so as to form as second order SiC nanoparticles; and
    Step G: calcining the second order SiC nanoparticles in a calcination oven so as to form as third order SIC nanoparticles which is the complex Si—C based unit.

2. The method for manufacturing complex Si—C cathode base units, wherein in step A, the size of each graphene piece is smaller than 3 micrometers.

3. The method for manufacturing complex Si—C cathode base units as claimed in claim 1, wherein the method for pulverization is selected from one of orbital motion mixing, wet grinding, and high pressure uniform grinding.

4. The method for manufacturing complex Si—C cathode base units as claimed in claim 1, wherein in step B, the first high molecular material is selected from one of high molecular cellulose carbohydrate material or high molecular unsaturated carbohydrate material.

5. The method for manufacturing complex Si—C cathode base units as claimed in claim 1, wherein in step B, a weight ratio of the graphene pieces, the ethanol, and the first high molecular material are (0.15~0.20):(0.01~0.015):(0.77~0.84).

6. The method for manufacturing complex Si—C cathode base units as claimed in claim 4, wherein in step B, the high molecular cellulose carbohydrate, and the high molecular unsaturated carbohydrate is selected from one of CMC (Carboxymethyl cellulose), Alginate, PVP(Polyvinylpyrrolidone), PVA(Polyvinyl alcohol), and Glucose.

7. The method for manufacturing complex Si—C cathode base units as claimed in claim 1, wherein in step C, the way for mixing is one of high pressure homogenizer and orbital motion mixer.

8. The method for manufacturing complex Si—C cathode base units as claimed in claim 1, wherein in step C, the x in SiOx is smaller than 2.

9. The method for manufacturing complex Si—C cathode base units as claimed in claim 1, wherein in step E: a weight ratio of the first order SIC nanoparticles, the second high molecular material and the nanometer carbon tubes are (0.80~0.84):(0.16~0.19):(0.0001~0.005).

10. The method for manufacturing complex Si—C cathode base units as claimed in claim 1, wherein in step E, the second high molecular material is high molecular polymerizable carbohydrate which is selected from one of CMC (Carboxymethyl cellulose), Alginate, PVP(Polyvinylpyrrolidone), PVA(Polyvinyl alcohol), and Glucose.

11. The method for manufacturing complex Si—C cathode base units as claimed in claim 1, wherein in step E: a molecular weight, polymerization and viscosity of the second high molecular material are higher than those of the first high molecular material.

12. The method for manufacturing complex Si—C cathode base units as claimed in claim 1, wherein in step E, the nanometer carbon tubes are array nanometer carbon tubes lengths of which are between 15-25 μm.

13. The method for manufacturing complex Si—C cathode base units as claimed in claim 1, wherein in step F: the first order SiC nanoparticles, the second high molecular material and the nanometer carbon tubes are shaped through VC homogenization (mixing through V shape homogenization machine).

* * * * *